F. D. JONES.
PHOTOGRAPHIC APPARATUS.
APPLICATION FILED APR. 14, 1908.

1,113,646.

Patented Oct. 13, 1914.
4 SHEETS—SHEET 2.

Witnesses
Frank R. Glove
H. C. Rodgers

Inventor
F. D. Jones
By George F. Thorpe Atty.

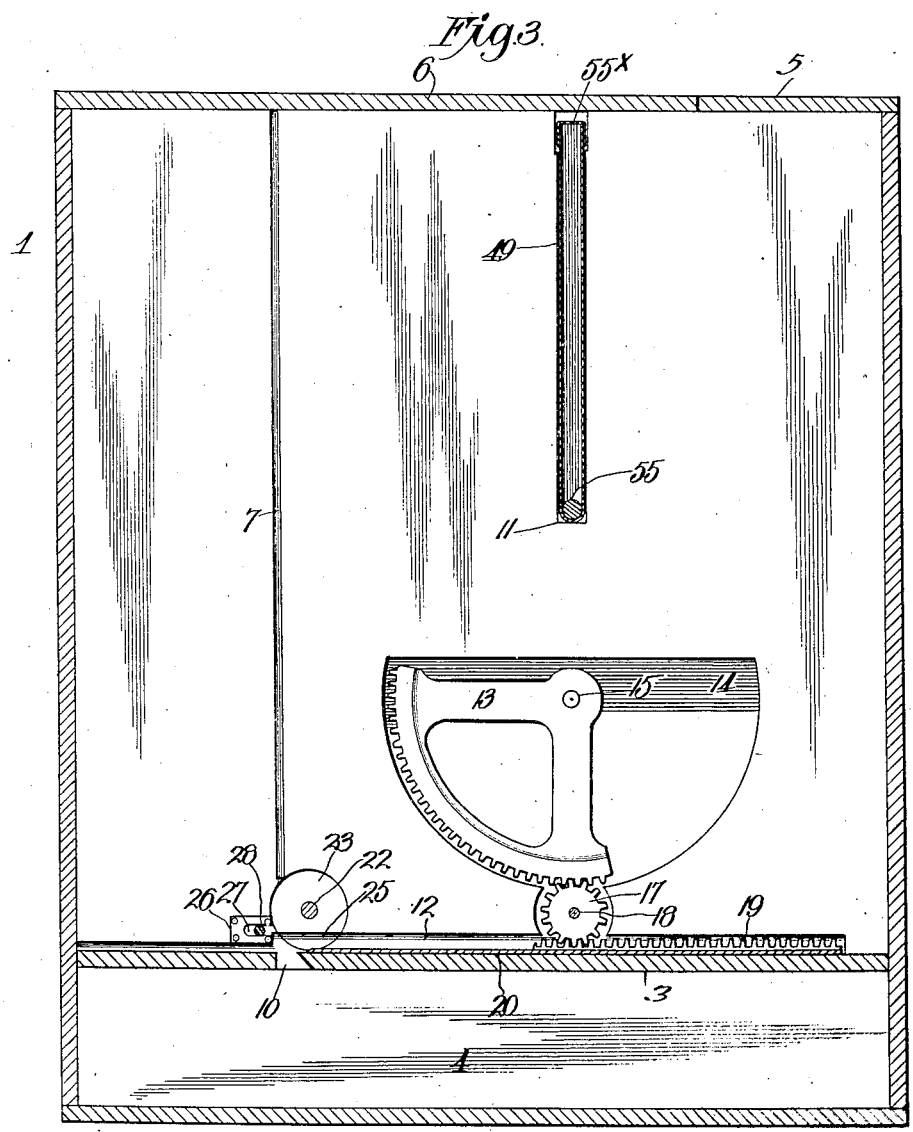

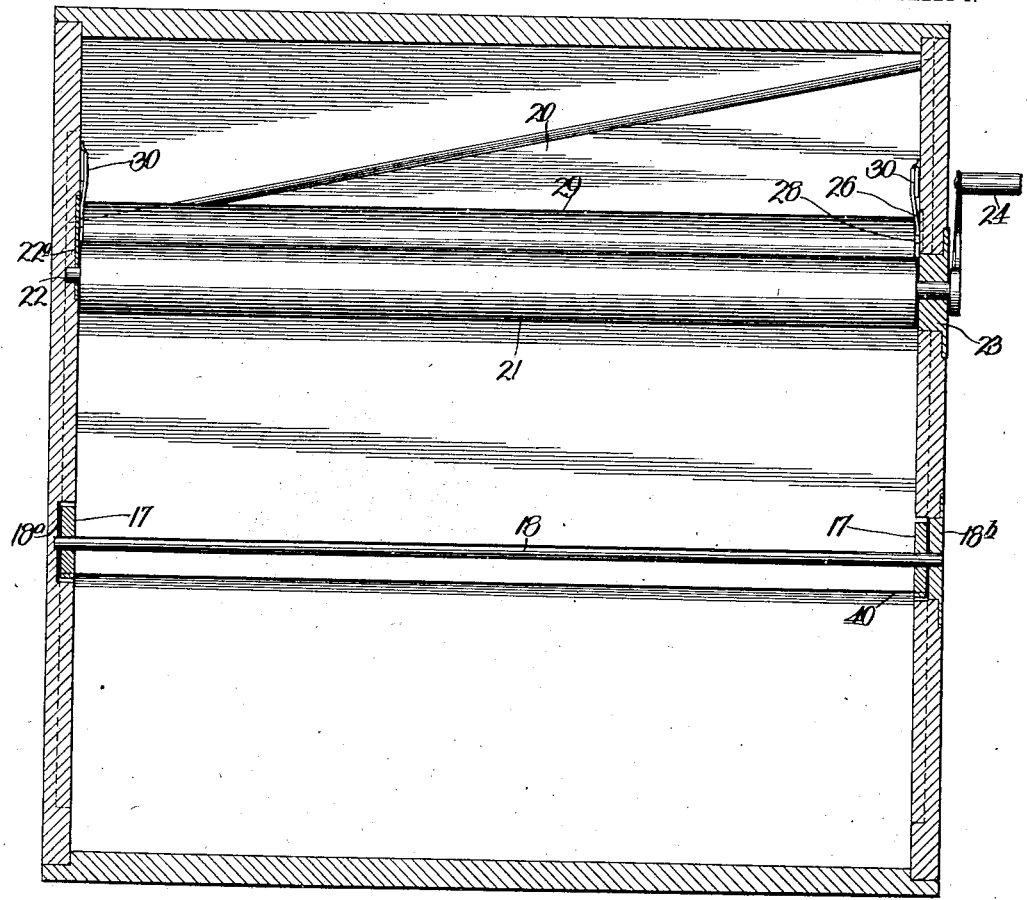

UNITED STATES PATENT OFFICE.

FLOYD D. JONES, OF KANSAS CITY, MISSOURI, ASSIGNOR, BY MESNE ASSIGNMENTS, TO COMMERCIAL CAMERA COMPANY, OF PROVIDENCE, RHODE ISLAND, A CORPORATION OF RHODE ISLAND.

PHOTOGRAPHIC APPARATUS.

1,113,646.     Specification of Letters Patent.     Patented Oct. 13, 1914.

Application filed April 14, 1908. Serial No. 426,948.

*To all whom it may concern:*

Be it known that I, FLOYD D. JONES, a citizen of the United States, residing at Kansas City, in the county of Jackson and State of Missouri, have invented certain new and useful Improvements in Photographic Apparatus, of which the following is a specification.

My present invention relates to photographic cameras and more particularly to cameras of that type wherein a portion of a roll of sensitized paper, or its equivalent, may be exposed to receive an image and then cut from the roll and deposited or stored within a suitable receiving means that may or may not also be adapted for its future development, all without the use of a dark room.

A further object of the invention is to produce a machine of this character for efficiently, reliably and expeditiously accomplishing the purposes mentioned and one that may be used more particularly for commercial purposes such as the copying of documents or specimens.

A further object is to produce such a machine, which can be operated by an unskilled person, and which is of small and light construction in order that one person may easily carry it about.

With these general objects in view and others as hereinafter appear, the invention consists in certain novel and peculiar features of construction and organization as hereinafter described and claimed; and in order that it may be fully understood reference is to be had to the accompanying drawings, in which:—

Figure 1:
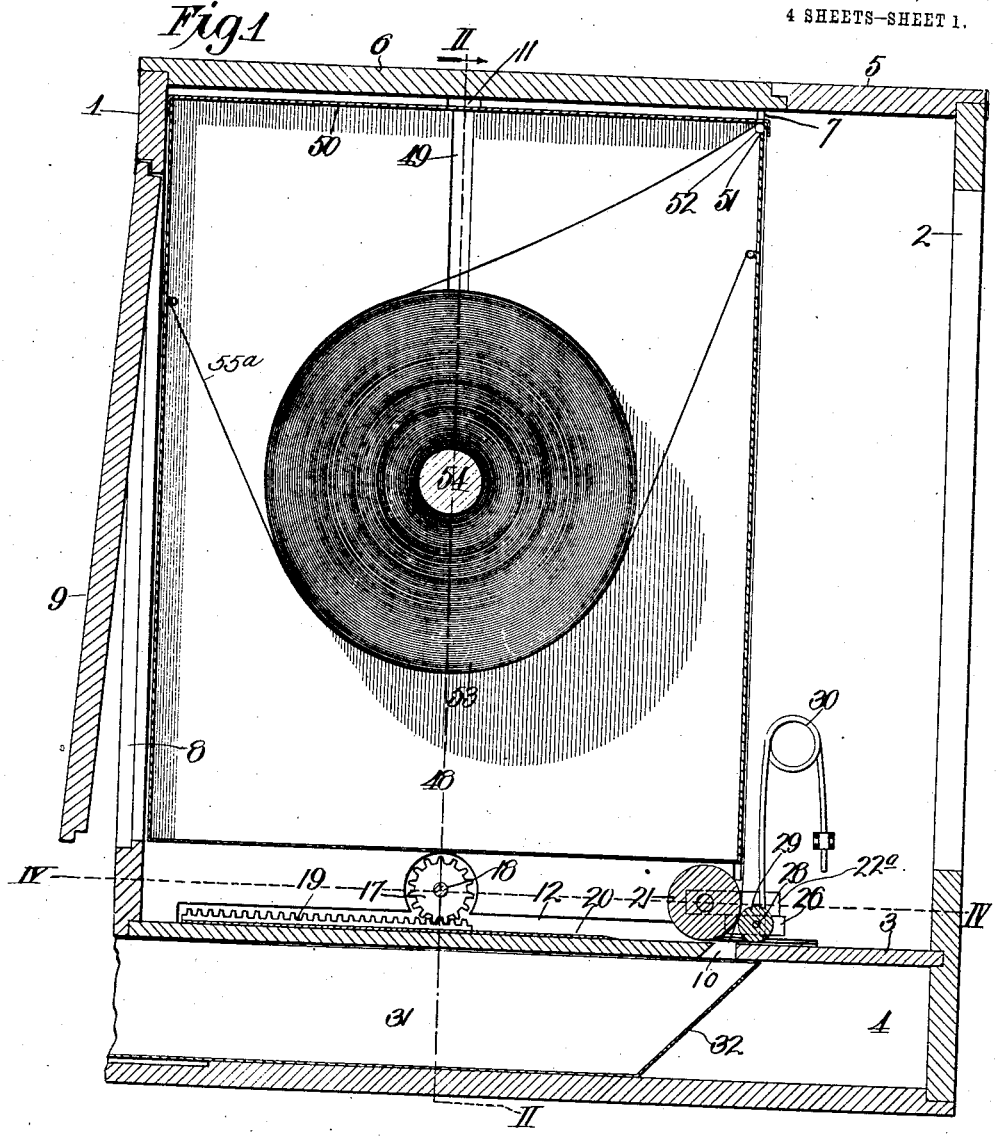
Figure 2:
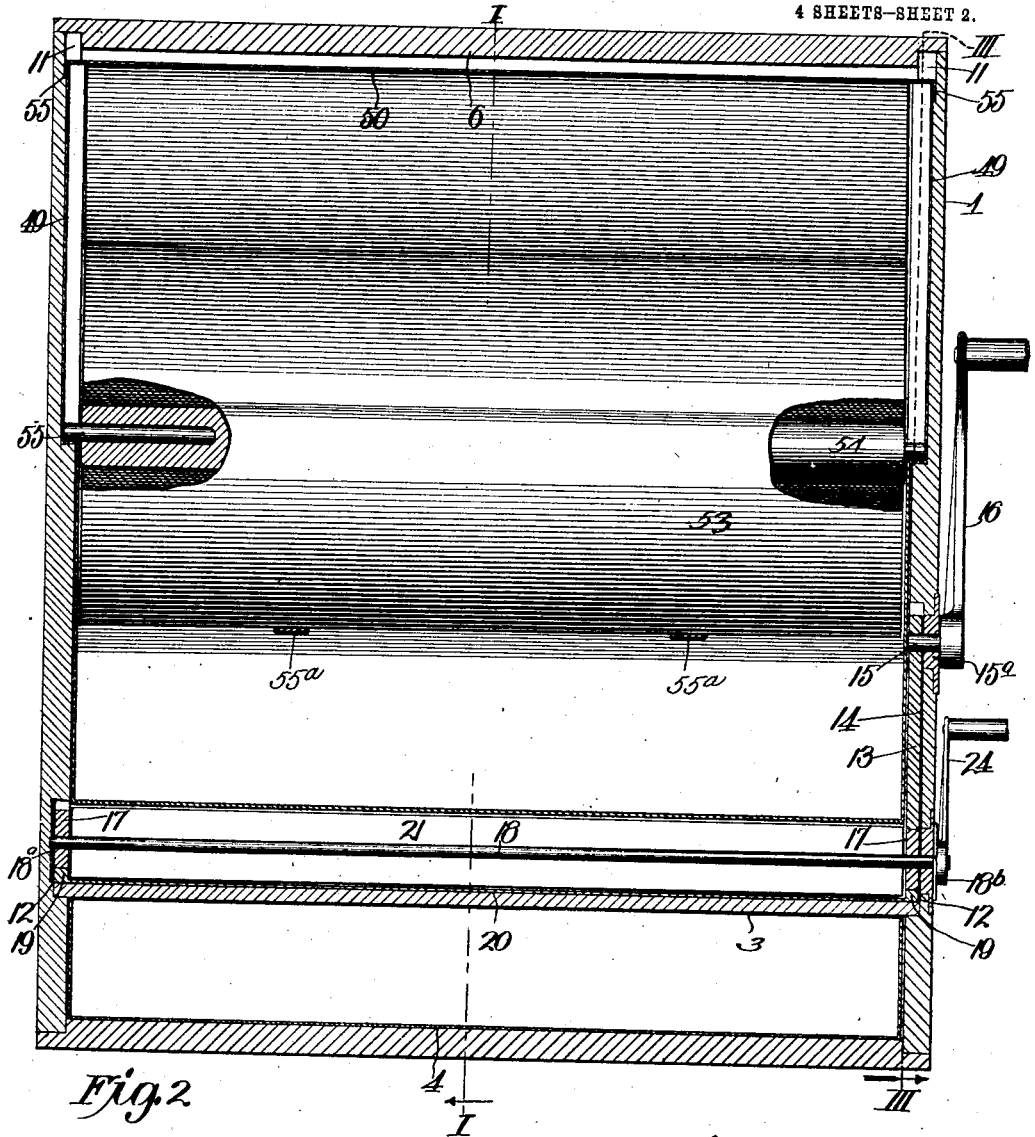
Figure 5:
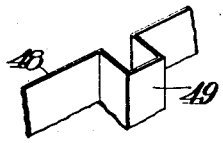
Figure 6:
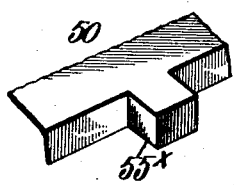

Figure 1, is a vertical section on the line I—I of Fig. 2, but with the roll of sensitized paper in elevation. Fig. 2, is a section on the line II—II of Fig. 1. Fig. 3, is a section on line III—III of Fig. 2. Fig. 4, is a section on line IV—IV of Fig. 1. Fig. 5, is a perspective view of a part of the box containing the roll of sensitized paper. Fig. 6, is a detail perspective view of a part of the cover for said box.

In the said drawings, 1 indicates a box, preferably of wood, and provided in its front wall with an opening 2, establishing communication between the box and the bellows of the camera, the bellows being omitted because of common and well known construction.

3 indicates a false bottom, dividing the box into an upper or exposure chamber and a lower or receiving chamber 4. The top of the box preferably consists of a pair of hinged lids 5 and 6, adapted to step-joint together at their free edges, to exclude light from the box. The side walls of the box adjacent to the vertical plane of the meeting edges of said lids, are provided with vertical grooves 7, terminating a short distance above the false bottom 3, these grooves being adapted to receive the ground glass (not shown) when focusing the object through opening 8, of the rear wall of the box, which opening is adapted to be closed to exclude the light by the hinged door 9. Vertically below the grooves 7 the false bottom is provided with a transverse slot 10, for a purpose which hereinafter appears, and rearward of said grooves, the walls of the box are provided with vertical grooves 11, terminating in about the horizontal center of the upper chamber of the box. Below said grooves 11, the side walls are provided with horizontal grooves 12, which communicate with slot 10, and intersect the vertical plane of the grooves 7.

13 indicates a cog segment, occupying and adapted to turn in a recess 14, in one of the side walls, said segment being secured on the inner end of a short shaft 15, journaled in a plug 15ª, closing an opening in the said wall, the said shaft externally of the box, being equipped with a crank handle 16, by which it is turned.

17 indicates a pair of cog pinions, secured on transverse shaft 18, journaled in a wear plate 18ª, at one end, and at the other in a plug 18ᵇ, closing an opening in the side wall at such end, the plug being of greater diameter than the cog pinions, to permit the latter and the shaft to be slipped into or out of the box through said plug-closed opening. One of the cog pinions meshes with the cog segment 13, and both with the rack bars 19, occupying grooves 12, and secured to or formed integral with the reciprocatory knife or cutter 20, having its front or cutting edge extending obliquely, as shown in Fig. 4, to effect a draw cut.

21 indicates a feed roller, arranged transversely of the machine, and having its shaft 22 journaled at one end in the wear plate 22ª, and at the other end in the plug 23, closing an opening in the corresponding side wall, of greater diameter than said roller, the latter being equipped with a crank handle 24, externally of the box, it being noticed by reference to Fig. 3, that the inner face of plug 23 is cut away, as at 25, so as to avoid obstructing the contiguous groove 12 and the rack bar 19, which reciprocates in said groove, though it is obvious that the inner face of the plug may terminate outward of said groove, and thus avoid obstructing the latter, if such construction is preferred.

26 indicates a pair of thin plates, set in the walls of the box, forward of roller 21, and provided with longitudinal slots 27, to receive the spindles 28, of a small feed roller 29, held by the pressure on its spindles of a pair of springs 30, secured to the side walls, against feed roller 21, or a strip of paper, if the latter is interposed between said rollers.

A pan or other suitable receiving or storing means 31 is slidably fitted within the receiving chamber 4 which latter, as before described, is below the exposing chamber and preferably broad and shallow as to general dimensions. At a point adjacent the delivery passage 10 that connects the two chambers, the pan is preferably provided with an inclined surface 32 which, in the present instance, is constituted by the end wall of the pan.

48 indicates a preferably sheet metal box, to fit snugly in box 1, with its front wall disposed in about the plane of grooves 7, this box being formed with outwardly projecting, hollow, vertical ribs 49, to fit snugly in grooves 11 and rest upon the bottom thereof, and 50 indicates a flanged cover for said box, the flange at its front edge being spaced slightly from the front wall of its box and about equal in depth to the transverse slot 51, in the upper front corner of said box, an anti-friction roller 52, being journaled in said slot as a guide for the web of a paper roll 53, mounted upon a shaft 54 equipped with spindles 55 which project into and rest on the bottom of hollow rib 49, it being noticed, by reference particularly to Figs. 2, 3 and 6, that the cover 50 is provided with extensions 55ˣ, to fit down over the hollow ribs of box 48, to exclude light from the same.

55ª indicates a pair of flexible strips which are attached at their opposite ends to the front and back walls of the sensitized roll-carrying box and are stretched to peripherally engage said roll so that they will contract as the roll diminishes in size and diminish their pressure thereagainst as the roll becomes smaller and in practice these friction strips prevent movement of the roll except when positively moved by the operation of the feed rollers.

After the desired focus is obtained in the manner hereinbefore explained and the ground glass has been removed the box 48 containing the roll or web of sensitized paper or equivalent material is slipped into the box 1. The operator may then, by suitably covering himself and the machine, arrange the paper as shown in Fig. 1, where it will be noticed it is extending upwardly and forwardly over the roller 52 and downward at the front side of said box 48 and between the feed rollers 21 and 29, the paper being secured between the latter by pressing it between the same and while holding it in this position turning the crank shaft 24 a part of a revolution so as to cause the rollers to feed the paper downward between them.

After box 1 has been properly closed so as to exclude all light, the machine is ready to photograph or print the object when the shutter of the camera is opened, the exposure being for any desired period of time, after which the shutter is again closed. The operator then turns crank arm 24 a sufficient number of times to feed the exposed portion of the web past the feed rollers, the paper passing down through slot 10 into pan 31 and being deflected rearward therein by the inclined wall 32. The operator then turns crank handle 16 and through the intermediate gearing causes the knife to move from the position shown in Fig. 1 to the position shown in Fig. 4 and back again the knife severing the paper below the feed rollers in this operation, and the severed portion of the paper slipping wholly down into the pan. As the severed sheet emerges from the opening 10 into the receiving chamber 4, it first engages the inclined end surface 32 of the pan 31 which acts as a guide to turn it horizontally and, in the present instance, rearwardly so that it assumes a flat horizontal position within the pan 31 and makes way for the introduction of succeeding sheets if a number of successive exposures are to be received and stored there, instead of being removed individually after each exposure. The surface 32 is furthermore inclined in that direction whereby it will be tangent to the natural curl of the advancing sheet, due to the previous rolled condition thereof, and hence the sheet will glide over it easily and without resistance. Thus, with the particular arrangements of Fig. 1, were the sensitized material drawn from the bottom of the roll rather than the top, its tendency would be to curl to the right instead of the left as it passed through the delivery passage 10 and a reverse inclination would be more expedient on the part of the guiding surface 32 so that the pan 31 would preferably extend therefrom forwardly instead of rearwardly, as shown. By repeating the operations described, any number of prints of the object may be taken and delivered one by one into the chamber 4 and pan 31, or different objects such as different pages of an abstract or record may be successively photographed, it being apparent that the operation of securing and removing one or many prints can be performed efficiently, reliably and expeditiously. It will also be understood that if desired all the prints can be severed and stored in the pan, because said pan is preferably light-proof.

If it is desired to remove or otherwise treat the prints as they are made, the knife after each forward movement is left in its advanced position so as to completely bridge and cover slot 10 and thus effectually cut off the entrance of light to box 1 through said slot. Of course, any suitable developing means for immediately developing and fixing the exposed sensitized sheet or print may be arranged in or substituted for the chamber 4 and pan 31 or the latter may itself constitute a liquid holding medium for the reception of treating solutions, but such features form no part of the present invention.

From the above description it will be apparent that I have produced a photographic machine embodying the features enumerated as desirable which can be operated by an unskilled person and which can be handled or transported from place to place with ease and convenience, and I wish it to be understood that I do not desire to be restricted to the exact details of construction shown and described as obvious modifications will suggest themselves to one skilled in the art.

Having thus described the invention what I claim as new and desire to secure by Letters-Patent is:—

1. An apparatus of the character described, comprising a box having an opening at the top thereof and an exposure opening in its front wall, a box within the first named box removable through the top of the latter and provided with an exit-opening, feed rollers suitably journaled within the outer box below the inner one, a suitably journaled support for a roll of sensitized material within the inner box the web of material being adapted to extend therefrom through the exit opening and down to and between said feed rollers, means to operate said rollers to feed the web of material between them from the roll, and means to sever that portion of the material which has passed between said rollers.

2. An apparatus of the character described, comprising a box having an opening in its front wall, a box within the first named box and provided with an exit-opening, feed rollers suitably journaled within the outer box below the inner one, a suitably journaled support for a roll of sensitized material within the inner box from which the web of material is adapted to be extended through the exit opening and down to and between said feed rollers, means to operate said rollers to feed the web of material between them from the roll, and a reciprocatory knife operating independently of the feed rollers to sever that portion of the material which has passed between said rollers.

3. An apparatus of the character described, comprising a box having an opening in its front wall, a transverse guide within the box rearward of said opening, feed rollers suitably journaled within the box below the guide, a suitably journaled support for a roll of sensitized material within the box from which the web of material is adapted to be withdrawn to engage the guide and extended therefrom down to and between said feed rollers, means to operate said rollers to feed the web of material between them from the roll, means to receive the material fed past the rollers, a reciprocatory knife to operate between the feed rollers and the receiving means, provided with rack bars, a shaft suitably journaled and provided with cog pinions engaging said rack bars, a pivoted member engaging one of said pinions, and a handle at the outer side of the box for operating said member.

4. In a photographic apparatus, the combination with an outer casing forming an exposure chamber and having an opening at the top thereof and an exposure opening in one of its side walls, of an inner casing inclosed thereby and having an open top registering with the open top of the outer casing, a plane side wall of the inner casing being disposed opposite the exposure opening in the outer one and provided with an opening at its top edge, a drum journaled in the inner casing supporting the roll of sensitized material, a closure for the open top of the inner casing provided with a flange for excluding light from the opening at the top of its side wall and means for feeding a web of the sensitized material from the roll through said last mentioned opening and across the outer surface of said side wall past the exposure opening in the outer casing.

5. In a photographic apparatus, the combination with an outer casing having vertical channels in its side walls and forming an exposure chamber, of an inner removable casing inclosed thereby and having corresponding channels in its inner walls, said walls being offset in the region of the channels to form projecting ribs guided and supported in the channels of the outer casing, a reel adapted to be inserted in and removed from the channels of the inner casing and having bearings at the ends thereof, and means for feeding a web of sensitized material from the reel to position for exposure in the exposure chamber.

6. In a photographic apparatus, the combination with an outer casing forming an exposure chamber and an inner casing containing the sensitized material and supported therein above the floor or bottom wall thereof, said inner casing being provided with a side wall having a plane outer surface, of a feed roller arranged between the bottoms of the inner and outer casings with its periphery tangent to the plane of the outer surface of said side wall of the inner casing and adapted to draw a web of paper across said wall into position for exposure.

7. In a photographic apparatus, the combination with an exposing chamber and a receiving chamber having a single communicating passage through which a web of sensitized material is fed from one chamber to the other, of a knife for severing the web after passage into the developing chamber, said knife operating to seal the passage by virtue of its position at the conclusion of its cutting stroke.

8. In a photographic apparatus, the combination with a casing forming an exposing chamber and a receiving chamber separated by a wall or partition having a single slot or opening therein and means for feeding a web of sensitized material therethrough, of a knife arranged to reciprocate across the partition to sever the web and close the opening.

9. In a photographic apparatus, the combination with a casing forming an exposing chamber and a receiving chamber separated by a wall or partition having a single slot or opening therein and means for feeding a web of sensitized material therethrough, of a knife arranged to reciprocate across the partition to sever the web and close the opening, a rack carried with the knife, gearing meshing with the rack and a crank on the exterior of the casing for driving the gearing.

10. In an apparatus of the character described, the combination with a camera box comprising an upper exposing chamber and a horizontally arranged, shallow lower receiving chamber, the said chambers being connected by a delivery passage, of means for feeding sheets of sensitized material from the exposing chamber through the delivery passage into the receiving chamber and an inclined surface in the latter adjacent to the delivery passage for guiding the sheets to a horizontal position within the receiving chamber.

11. In an apparatus of the character described, the combination with a camera box comprising an upper exposing chamber and a horizontally arranged shallow lower receiving chamber for the exposed material, said chambers being connected by a delivery passage, of means for mounting a continuous rolled web of sensitized material in the exposing chamber, means for feeding the material after exposure through the passage into the receiving chamber and an inclined surface in the latter adjacent to the passage for guiding the sensitized sheet to a horizontal position within the receiving chamber, the said guiding surface being inclined in that direction whereby it will be tangent to the natural curl of the advancing sheet due to the previous rolled state thereof.

12. In a photographic apparatus, the combination with a camera casing having an inner box or compartment for a roll of sensitized material, the front wall of said box or compartment being in the focal plane of the camera, means for guiding the sensitized material over the top of said wall, feed rollers arranged below the wall and adapted to draw the material across the latter as a support into position for exposure, a knife arranged to reciprocate beneath the bottom wall of the inner compartment and adapted to sever the material at a point beneath the feed rolls, and means for actuating the knife independently of the feed rolls.

13. In a photographic apparatus, the combination with a camera casing having an inner box or compartment for a roll of sensitized material, the front wall of said box or compartment being in the focal plane of the camera, feed rollers arranged below the wall and adapted to draw the material across the latter as a support into position for exposure, a reciprocatory knife arranged below the bottom wall of the inner compartment to sever the material at a point below the feed rolls and means for actuating the knife, comprising a rack connected with the knife to reciprocate beneath the bottom wall of the inner compartment, a gear journaled in the casing and meshing with the rack and a crank on the exterior of the casing for turning the gear.

In testimony whereof I affix my signature, in the presence of two witnesses.

FLOYD D. JONES.

Witnesses:
H. C. RODGERS,
G. Y. THORPE.